(12) United States Patent
Wright et al.

(10) Patent No.: US 6,760,566 B1
(45) Date of Patent: Jul. 6, 2004

(54) METHOD AND APPARATUS FOR CONTROLLING A TRANSMISSION POWER THRESHOLD OF A SATELLITE COMMUNICATION SYSTEM

(75) Inventors: David A. Wright, Hermosa Beach, CA (US); Dennis A. Nivens, Hermosa Beach, CA (US); Michael S. Munoz, Redondo Beach, CA (US); Reginald Jue, Manhattan Beach, CA (US); Dominic P. Carrozza, Redondo Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 513 days.

(21) Appl. No.: 09/596,811

(22) Filed: Jun. 19, 2000

(51) Int. Cl.[7] .............................................. H04B 7/185
(52) U.S. Cl. ...................... 455/13.4; 455/522; 370/318
(58) Field of Search .............................. 455/13.4, 12.1, 455/3.01, 3.02, 522, 69, 430, 427; 370/318, 317

(56) References Cited

U.S. PATENT DOCUMENTS

| | | | |
|---|---|---|---|
| 4,910,792 A | | 3/1990 | Takahata et al. |
| 5,864,547 A | | 1/1999 | Strodtbeck et al. |
| 5,924,015 A | * | 7/1999 | Garrison et al. ............ 455/13.4 |
| 6,173,187 B1 | * | 1/2001 | Salonaho et al. ........... 455/453 |
| 6,219,528 B1 | * | 4/2001 | Wright et al. ............... 455/13.4 |
| 6,240,124 B1 | * | 5/2001 | Wiedeman et al. ......... 375/130 |
| 6,298,220 B1 | * | 10/2001 | Barnhart et al. .............. 455/69 |
| 6,430,394 B1 | * | 8/2002 | Boyden ...................... 455/13.4 |

* cited by examiner

*Primary Examiner*—Nick Corsaro
(74) *Attorney, Agent, or Firm*—Tarolli, Sundheim, Covell & Tummino L.L.P.

(57) ABSTRACT

A method and apparatus for closed-loop power threshold leveling for a satellite communication system. An aspect of the present invention includes a plurality of user earth terminals (UET), a satellite and a network control center (NCC). The NCC polls the UETs to obtain power profile information. When polled, the UELTs form power profile responses and send the responses back to the NCC. The NCC forms a power profile database and statistically analyzes the power profile information to determine an uplink power threshold adjustment. The NCC transmits the uplink power threshold adjustment to the satellite, which adjusts an on-board uplink power level threshold in response to the uplink power threshold adjustment. In systems using mutltiple coding levels, the NCC determines uplink power offset values corresponding to the individual coding levels. The NCC delivers the uplink power offset values to the UETs which update their local power offset values.

31 Claims, 4 Drawing Sheets

METHOD AND APPARATUS FOR CONTROLLING A TRANSMISSION POWER THRESHOLD OF A SATELLITE COMMUNICATION SYSTEM

BACKGROUND OF THE INVENTION

The present invention relates generally to satellite communication systems. More specifically, the present invention relates to controlling uplink power in a satellite communication system.

Satellites have long been used to provide communication services to large regions of the earth. Modern satellites have been proposed for operation at frequencies of 20 to 30 GHz and to produce a beam which may cover an area on the earth (cell) with a diameter of 300 to 400 miles. Many of these cells are combined to cover large geographical areas. For bandwidth efficiency, non-adjacent cells often communicate using identical frequencies. Frequency re-use between non-adjacent cells introduces co-channel interference into the system. For example, imperfect antenna patterns often contain significant side lobes. Signals transmitted in one cell with large side lobes interfere with signals transmitted in a non-adjacent cell at the same frequencies. As co-channel interference increases, the system experiences a lower signal-to-background ratio (SBR), and hence, a higher error rate. Given the desire to minimize the error rate, or maximize the SBR, one goal in a cellular satellite communication system is to minimize the contribution to background level (B) caused by co-channel interference. Co-channel interference (CCI) is, in part, dependent upon the power level at which signals are transmitted. Hence, co-channel interference may be reduced by reducing the power used to transmit signals.

Several factors adversely impact signal integrity in satellite communication systems. These factors, for example, include antenna gain within and across a cell, antenna beam pointing error, atmospheric conditions and co-channel interference from other signals. These factors typically lower the SBR of the signal, resulting in a higher error rate. One way to overcome the adverse effects of these factors is to increase the SBR by increasing the signal strength (S), and thus increasing the power used to transmit signals.

The desire to minimize co-channel interference by minimizing the transmit power and the desire to maximize signal strength S by maximizing the transmit power represent conflicting goals. Satellite systems employing both techniques to maximize the SBR must maintain a balance between too much power, resulting in a high co-channel interference level, and too little power, resulting in a low signal strength (S).

Ideally, the uplink power level threshold, to which a user earth terminal ("UET") initially converges, is very close to the power level used during communication. However changing atmospheric conditions, changing antenna beam characteristics, and changing noise environments may result in a substantial disparity between the uplink power level to which the earth terminal converges at the outset of communication, and the uplink power level, to which the earth terminal converges during the course of communication. The power level disparity, in turn, may result in inefficient bandwidth utilization. A substantial amount of bandwidth may be wasted by having an earth terminal converge its uplink transmit power to an uplink power level threshold that is no longer adequate due to a changing interference environment. A substantial amount of data may be lost before the UET adjusts to a more adequate uplink power level.

U.S. Pat. No. 4,910,792, entitled "Up-link Power Control in Satellite Communications System" (the '792 patent) illustrates one approach for controlling uplink transmission power to compensate for rain attenuation. The '792 patent illustrates a system including a-number of user stations 59, a reference earth station 58, and a satellite 50, identified at column 1, lines 41–43, which is "a mere repeater of signals, but has no facility to measure the power transmitted from each earth station." In operation, the transmission power of a reference signal transmitted from the reference earth station 58 is adjusted so that the received reference signal at the satellite is constant. Each user station 59 transmits a signal which is relayed to the satellite and back to the user station 59. Each of the earth stations 59 then detects the difference between the received reference signal from the reference earth station through the satellite and the level of the received signal with was sent from itself and relayed by the satellite. Each of the earth stations 59 then adjusts its uplink power based on the difference between the signals. That is, the '792 patent assumes that the reference burst 60 from the reference station 59 is received by the user station 59 with attenuation only on the downlink, while the burst 61 sent from the user station 59 is received at the user station 59 with the attenuation on both the uplink and downlink. Therefore, the difference between the received reference burst signal 60, and the user station burst 61 sent from the user station itself is the attenuation 62 in the uplink, as shown in FIG. 4(b). The '792 patent applies only to systems employing bent-pipe transponders, which are not present in a processing satellite communication system.

U.S. Pat. No. 5,864,547, entitled "Method and System for Controlling Uplirnk Power in a High Data Rate Satellite Communication System Employing On-Board Demodulation and Remodulation" (the '547 patent) illustrates another approach for controlling uplink transmission power. In operation, as shown in FIGS. 1 and 5, a downlink error rate of the data in a downlink data stream is determined based on known data bits transmitted by a satellite and received by a receiving terminal 12. An end-to-end error rate of the uplink data stream and the downlink data stream is then determined based on the number of errors in received data transmitted by a first user terminal 11 to the receiving terminal 12. The error rate of the uplink is then indirectly estimated based on the downlink error rate and the end-to-end error rate with reference to a lookup table. Finally, the power of the uplink is controlled based on the indirect estimate of error rate of the uplink. Thus, the '547 patent relies on an indirect estimate of uplink signal quality using downlink signals. Therefore, errors introduced in the downlink may not reliably be separable from errors introduced in the uplink. The '547 patent does not determine the uplink error rate directly.

Thus, a need has long existed for a system and method for controlling the uplink power in a satellite communication system. A need has especially existed for such a system and method able to control uplink power in an uplink channel affected by gain roll-off, antenna pointing errors, atmospheric attenuation, and co-channel interference. A need has also long existed for a system and method for controlling the uplink power level to compensate for a dynamic interference environment.

SUMMARY OF THE INVENTION

The preferred embodiments of the present invention provide a method and apparatus for power threshold leveling in a satellite communication system. A preferred embodiment of the present invention first obtains uplink power level information for a plurality of earth terminals. The uplink power level information may, for example, include indications of uplink reference power levels, uplink power levels converged to during communication, or the difference between the two. The uplink power level information may also include frequency channel, time slot, and coding level information. Statistical characteristics are then determined for the uplink power level information received from the plurality of earth terminals. For example, the mean or variance of the uplink power levels may be determined. An uplink power level threshold adjustment is determined from the statistical characteristics and used to modify the uplink power level threshold. The apparatus of the preferred embodiment includes a satellite communication system including a satellite, user earth terminals (UETs), and a network control center (NCC). The satellite stores uplink power level threshold information which the satellite uses initially to control the uplink power level of UETs. The satellite intermittently receives uplink power level threshold adjustments from the NCC and uses these adjustments to modify the stored uplink power level threshold information. The UETs receive power profile information requests from the NCC and respond by sending uplink power profile information back to the NCC. The uplink power profile information may include a list of frequency channels and time slots in use by the UET along with respective uplink power level and coding information. The NCC obtains power level information for the UETs. The power level information includes uplink power level information for the UETs and may also include frequency channel, time slot, and coding information. The power level information may be obtained from various system entities, like the UETs, at various points in time. The NCC statistically analyzes the uplink power level information to arrive at an uplink power threshold adjustment, which the NCC communicates to the satellite. The NCC may also determine uplink power offsets corresponding to different coding levels used by the system, which the NCC then distributes to the UETs or other system entities.

The preferred embodiment of the present invention may be a component of a comprehensive uplink power control system, such as that described in U.S. patent application Ser. No. 09/596,683 filed Jun. 19, 2000, titled "Comprehensive System and Method for Uplink Power Control in a Satellite Communication System."

DETAILED DESCRIPTION OF THE PREFERRED EMBODIMENT

Figure 1:
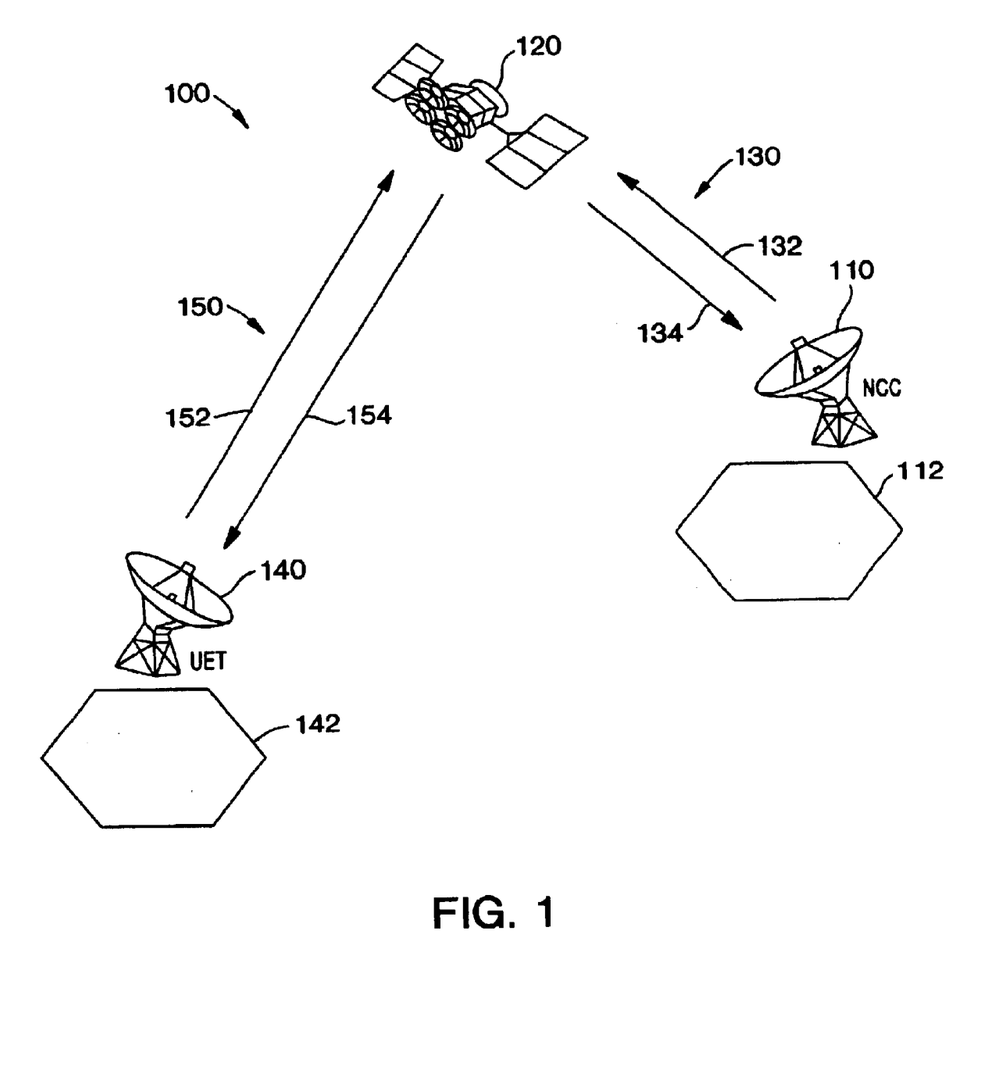
FIG. 1 illustrates a satellite communication system implementing power threshold leveling according to an embodiment of the present invention.

FIG. 1 illustrates a satellite communication system 100 implementing power threshold leveling according to an embodiment of the present invention. The satellite communication system 100 includes a Network Control Center (NCC) 110 located in a NCC cell 112, a satellite 120, and a User Earth Terminal (UET) 140 located in a UET cell 142. The NCC 110 communicates with the satellite 120 via a NCC/Sat communication link 130. The NCC/Sat communication link 130 includes a NCC uplink 132 and a NCC downlink 134. The satellite 120 communicates with the UET 140 via a UET/Sat communication link 150. The UET/Sat communication link 150 includes a UET uplink 152 and a UET downlink 154.

In operation, signals may propagate from the NCC 110 to the satellite 120 via the NCC uplink 132 of the NCC/Sat communication link 130. Signals may also propagate from the satellite 120 to the NCC 110 via the NCC downlink 134 of the NCC/Sat communication link 130. Additionally, signals may propagate from the satellite 120 to the UET 140 via the UET downlink 154 of the UET/Sat communication link 150. Finally, signals may propagate from the UET 140 to the satellite 120 via the UET uplink 152 of the UET/Sat communication link 150.

Figure 2:
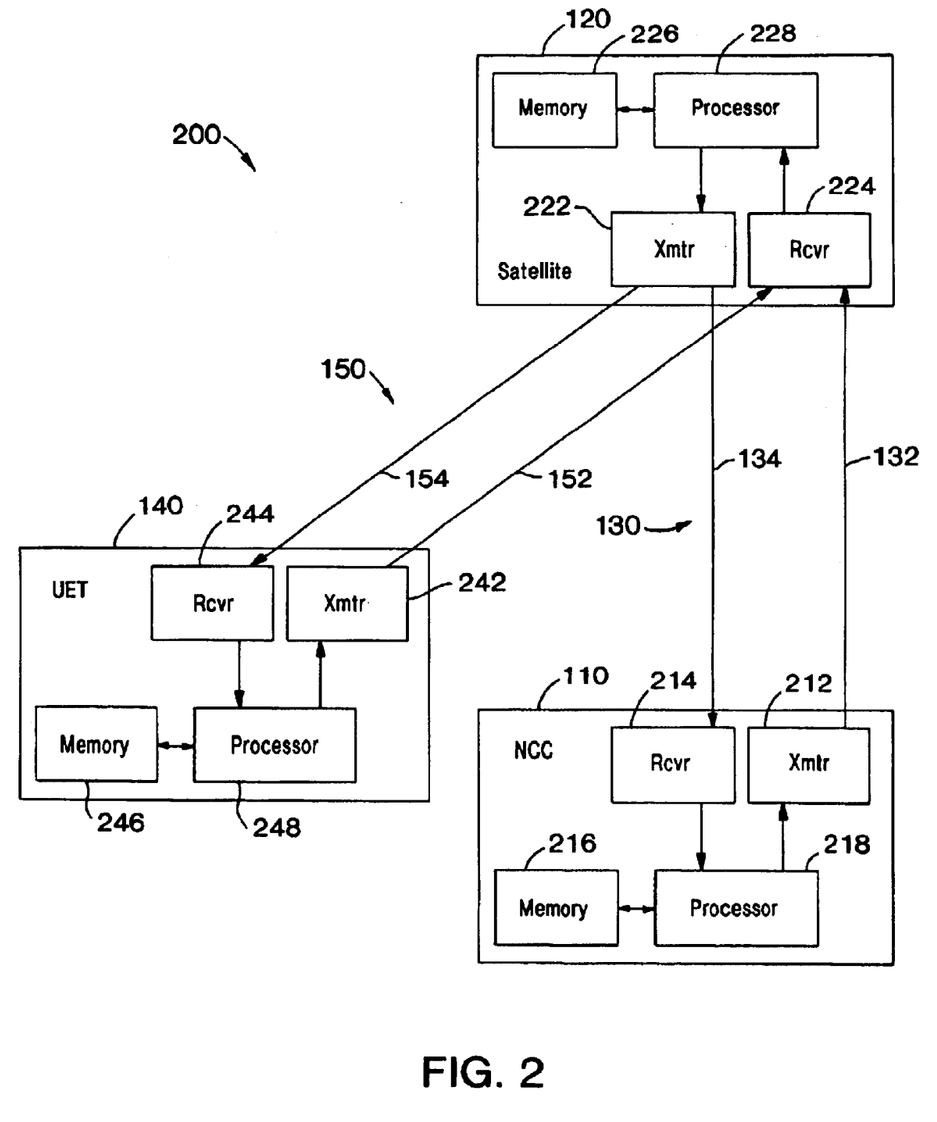
FIG. 2 shows a block diagram of the satellite communication system illustrated in FIG. 1 according to an embodiment of the present invention.

FIG. 2 illustrates a block diagram 200 of the satellite communication system 100 of FIG. 1, according to an embodiment of the present invention. The block diagram 200 includes the NCC 110, satellite 120, UET 140, NCC/Sat communication link 130, and UET/Sat communication link 150 of FIG. 1. The NCC 110 includes a NCC uplink transmitter 212, a NCC downlink receiver 214, a NCC memory 216, and a NCC processor 218. The satellite 120 includes a satellite downlink transmitter 222, a satellite uplink receiver 224, a satellite memory 226, and a satellite processor 228. The UET 140 includes a UET uplink transmitter 242, a UET downlink receiver 244, a UET memory 246, and a UET processor 248.

The term "channel" is a general term that refers to a communication resource assigned to an individual UET for communicating in a satellite communication system. In a preferred embodiment of the present invention, the satellite communication system may use frequency division multiple access (FDMA) in combination with time division multiple access (TDMA) to formulate available communication resources. In such an FDMA/TDMA system, a channel is typically referred to as a "chanslot." A chanslot may be defined as a time slot in a frequency channel. Alternatively, the present invention may be implemented in many other types of satellite communication systems, including systems using code division multiple access (CDMA), only FDMA, only TDMA or any other combination of CDMA, FDMA and TDMA. A preferred embodiment of the present invention is described in detail below in the context of an FDMA/TDMA system.

In operation, the UET uplink transmitter 242 of the UET 140 transmits a synchronization signal (or "synch burst") over a selected chanslot in the UET uplink 152 to the satellite 120. During the transmission, the UET uplink transmitter 242 transmits at a predetermined uplink power level. The transmitted synch burst is received at the satellite uplink receiver 224 of the satellite 120. The satellite uplink receiver 224 then measures the energy level of the received synch burst to determine a received energy level measurement.

A predetermined uplink energy level threshold is stored in the satellite memory 226. Once the received energy level measurement has been determined at the satellite receiver 224, the received energy level measurement is passed to the satellite processor 228. The satellite processor 228 compares the energy level of the received signal to the uplink energy level threshold. The "uplink energy level threshold" will also be referred to herein as the "uplink power level threshold." Conversion between energy level and power level may be necessary depending upon the particular embodiment of the invention. The satellite processor 228 then determines a power adjustment signal for the UET uplink transmitter 242 based on the received energy level measurement relative to the energy level threshold. The satellite processor 228 then sends the power adjustment signal to the UET 140 using the satellite downlink transmitter 222. The power adjustment signal propagates to the UET 140 over the UET downlink 154.

The UET downlink receiver 244 receives the power adjustment signal and fowards the power adjustment signal to the UET processor 248. The UET processor 248 processes the power adjustment signal and commands the UET uplink transmitter 242 to adjust its uplink synch burst transmit power. A system and method for adjusting the uplink transmit power of a UET is further described in U.S. patent application Ser. No. 09/596,671 filed Jun. 19, 2000 entitled "Method and System for Controlling Uplink Power In a Satellite Communication System Using Power Leveling", the subject matter of which is incorporated in its entirety herein by reference. The preferred embodiment of this application illustrates an exemplary process of adjusting the uplink transmit power used by a UET for transmitting a synch burst based on energy level measurement by the satellite of a prior received synch burst is referred to herein as power leveling.

The uplink power leveling process operates to maintain the uplink power level of the UET uplink transmitter 242 at a level at which an associated received synch burst energy level at the satellite 120 is within a predetermined range of the uplink energy level threshold. As the power leveling process continues, the UET 140 stores its current uplink synch burst power level as its "UET uplink reference power level" in the UET memory 246.

In an additional embodiment of the invention, the uplink power adjustment cycle may include multiple iterative steps in which the satellite 120 directs the UET 140 to incrementally change the transmit power until the associated received signal achieves a power level within an accepted power range near the predetermined uplink power level threshold. The incremental changes in power may vary from large initial changes to small final changes.

As the UET 140 prepares to initiate a data transmission to the satellite 120, the UET is assigned one or more chanslots for the transmission of data signals (or "traffic bursts") over the uplink 152. The NCC 110 preferably performs the chanslot assignment. At the initiation of a data transmission, the uplink power level used by the UET 140 for transmitting traffic bursts in each assigned chanslot may be determined by adding a fixed offset value to the UET uplink reference power level. The fixed offset value is stored in the UET memory 246 and typically depends on the type of coding employed for the transmission of data in a given chanslot. A satellite communication system which employs more than one type of digital coding for the transmission of traffic bursts may require that the UET 140 stores in its memory 246 a separate fixed offset value corresponding to each type of digital coding that differs from type of coding used for the transmission of synch bursts. If traffic bursts are transmitted using the same type of coding which is used for the transmission of synch bursts (front which the UET uplink reference power level is derived), the offset value is typically zero. A satellite communication system which employs more than one type of coding for the transmission of traffic bursts is further described in U.S. patent application Ser. No. 09/163,775 filed Sep. 30, 1998, titled "Adaptive Coding Scheme for a Processing Communication Satellite," the contents of which are incorporated herein by reference.

As the data transmission continues between the UET 140 and the satellite 120, the satellite 120 may command the UET 140 to adjust its uplink traffic burst power level, for example, in response to a data error rate measured at the satellite 120. Since the amount of interference, and therefore the data error rate experienced by the satellite 120, may be different for each chanslot in which traffic bursts are transmitted, the satellite 120 may command the UET 140 to adjust its uplink traffic burst power level independently for each chanslot which is assigned to the UET 140 for the transmission of traffic bursts. Thus, at any point in time after a data transmission is initiated, the UET 140 will have a current UET uplink traffic burst power level for each assigned chanslot that may differ substantially from the UET uplink reference power level as well as from the current UET uplink traffic burst power level for any other assigned chanslot. The UET 140 stores its A system and method for adjusting the uplink power level of a UET in response to a data error rate is further described in U.S. patent application Ser. No. 09/596,344 filed Jun. 19, 2000, entitled "Method and System for Controlling Uplink Power In a Satellite Communication System Using Error Leveling", the subject matter of which is incorporated in its entirety herein by reference. In addition, a comprehensive system and method for uplink power control is further described in U.S. patent application Ser. No. 09/596,683 filed Jun. 19, 2000, entitled "Comprehensive System and Method for Uplink Power Control In a Satellite Communication System", the contents of which are incorporated herein by reference.

To adapt the uplink power level threshold to changing communication conditions, such as a dynamic interference environment, the NCC 110 polls the UETs 140 for uplink power level information (also referred to herein as UET power profile information). The NCC 110 may perform this adaptive function on a regular time schedule or it may be triggered by some condition, such as a detected shift in antenna beam pointing, a substantial shift in atmospheric conditions, or a degradation in overall system performance.

To poll the UETs 140, The NCC 110 initiates power profile requests to the UETs 140 in the system. The NCC 110 preferably determines the UETs 140 to poll from a database of UETs 140 known to be currently operating, but may alternatively poll all UETs 140 known to be located in a particular cell.

To poll a UET 140 for uplink power level information, the NCC processor 218 forms an uplink power profile request for the UET 140 and transmits it through the NCC uplink transmitter 212. The UET power profile request propagates to the satellite uplink receiver 224 over the NCC uplink 132. The satellite 120 relays the request through the satellite downlink transmitter 222. The request then propagates to the UET downlink receiver 244 over the UET downlink 154. The UET downlink receiver 244 receives the request and forwards the request to the UET processor 248.

When the UET processor 248 receives the UET uplink power profile request, it commands the UET uplink transmitter 242 to retrieve the current UET uplink traffic burst power levels for each chanslot from the UET power profile data, which are stored in the UET memory 246. The UET processor 248 also retrieves the UET uplink reference power level from the UET power profile stored in the UET memory 246. The UET processor 248 then forms a UET power profile response, which includes UET uplink power level information.

The uplink power level information preferably comprises the difference between the uplink traffic burst power levels and the uplink reference power level. However, the uplink power level information may alternatively comprise the uplink traffic burst and reference power level values. The difference between the uplink power levels may, for example, be indicated by a standard measure of power, such as Watts (W) or decibels. (dB). Alternatively, the difference may be expressed in terms of a number of discrete power steps, such as N steps, where each step represents a predetermined power increment, such as 0.125 dB. Alternatively, the uplink power level information may include a series of power levels at discrete points in time.

Once the UET processor 248 forms the uplink power profile response, it transmits the response via the UET uplink transmitter 242. The response propagates to the satellite uplink receiver 224 over the UET uplink 152. The satellite 120 forwards the response through the satellite downlink transmitter 222 to the NCC downlink receiver 214 over the NCC downlink 134. The NCC downlink receiver 214 forwards the uplink power profile response to the NCC processor 218 for processing. Although the request/response communication path preferably passes through the satellite 120, alternative communication paths, such as land lines, may be used.

The NCC processor 218 extracts the power level information from the response and adds the power level information to a database that the NCC processor 218 builds in the NCC memory 216. The database, when complete, will preferably contain uplink power level information for all of the UETs 140 polled by the NCC 110. The uplink power level information may, for example, be stored in a histogram format for storage and analysis efficiency.

When the NCC processor 218 completes building the database, the NCC processor 218 statistically analyzes the UET uplink power level information. The NCC processor 218 preferably calculates the mean of the uplink power level information. For example, the NCC processor 218 may determine that for all UETs polled, the uplink traffic burst power level for the average UET is 2 dB higher than the uplink reference power level. In addition, the NCC processor 218 may analyze the database of UET level information to arrive at an indication of the spread of the distribution. Such indication may, for example, comprise statistical variance or standard deviation. For example, the NCC processor 218 may determine that 90% of the UETs have an uplink traffic burst power level that is at least 2 dB higher than the uplink reference power level.

After the NCC 110 statistically analyzes the uplink power level information, the NCC 110 determines an uplink power threshold adjustment based on the statistical analysis. Assuming, for example, that similar coding schemes are employed for transmission of synch bursts and traffic bursts, if the NCC 110 determines in the statistical analysis that the average UET uplink traffic burst power level is 2 dB higher than the average UET uplink reference power level, the NCC 110 may arrive at an uplink power threshold adjustment of 2 dB (or alternatively N=16, where the step size is 0.125 dB).

Alternatively, if the NCC 110 also considered a spread, such as standard deviation, the NCC 110 may decide to command the threshold to be increased by the mean difference, as above, plus or minus n according to the proportion of UETs desired to begin data communication at an uplink power level above the estimated necessary uplink power level. As mentioned previously, there is a tradeoff between starting data communication with too little uplink power and too much uplink power. Thus, finding the optimal adaptive rule for a particular communication situation may require simulation or experience with the functioning system.

Once the NCC processor 218 arrives at an uplink power threshold adjustment, the NCC processor 218 sends it out via the NCC uplink transmitter 212. The uplink power threshold adjustment travels over the NCC uplink 132 to the satellite uplink receiver 224, which in turn forwards the adjustment to the satellite processor 228. The satellite processor 228 then retrieves the uplink power (or energy) level threshold from satellite memory 226, modifies the threshold according to the uplink power threshold adjustment, and restores the threshold in satellite memory 226. Thus, the system adapts the uplink power level threshold to changing communication conditions.

In a typical cellular satellite communication system, there may be many UETs communicating simultaneously. The UETs may each communicate using one or more chanslots. Preferably, a UET will transmit traffic bursts over all of its chanslots at a respective UET coding level and UET power level. However, in an alternate embodiment, a UET may communicate information over multiple chanslots, where each chanslot has a respective and independent power level and coding level.

Figure 3:
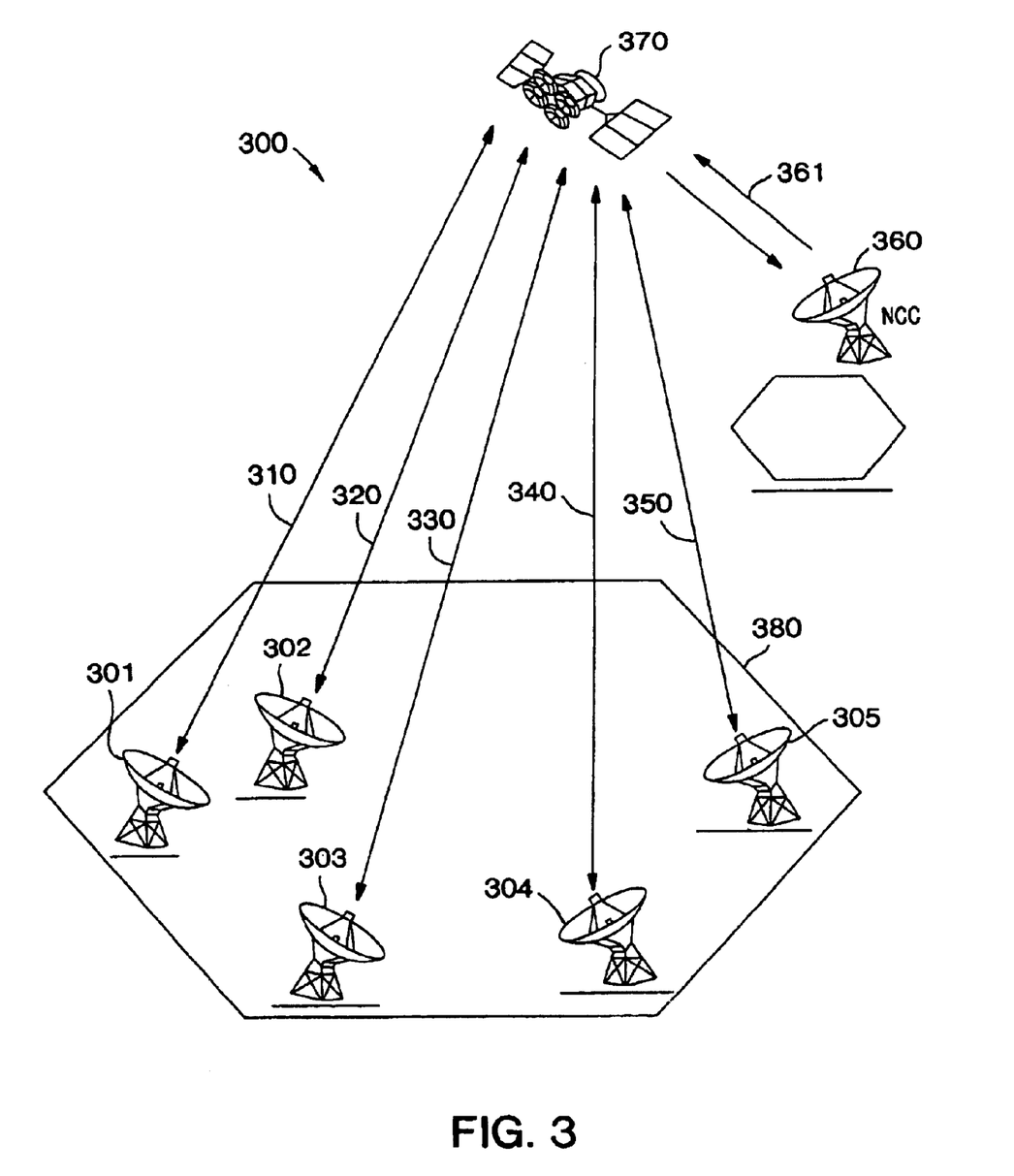
FIG. 3 shows a satellite communication system implementing power threshold leveling for many UETs communicating in a single cell according to an embodiment of the present invention.

FIG. 3 illustrates an exemplary satellite communication system 300 implementing power threshold leveling. The exemplary satellite communication system 300 includes five UETs 301–305, a NCC 360, and a satellite 370. The five UETs 301–305 are communicating in a single cell according to an embodiment of the present invention. In this example, UET1 301 communicates over communication link1 310 with power P1 and coding level C1 on chanslot1. UET2 302 communicates over communication link2 320 with power P2 and coding level C1 on chanslot2. UET3 303 communicates over communication link3 330 with power P3 and coding level C1 on chanslot3 and with power P4 and coding level C2 on chanslot4. UET4 304 communicates over communication link4 340 with power P5 and coding level C2 on chanslot 5, with power P6 and coding level C2 on chanslot6, and with power P7 and coding level C2 on chanslot7. UET5 305 communicates over communication link5 350 with power P8 and coding level C1 on chanslot8.

Since the satellite communication system 300 employs more than one type of igital coding C1, C2 for the transmission of traffic bursts, the NCC 360 preferably maintains separate databases in its memory for each type of digital coding employed. As power profile data is received by the NCC 360, it is compiled into the appropriate database according to the type of coding C1, C2. Since the NCC 360 preferably assigns chanslots and type of coding to the UETs 301–305, the NCC 360 has all of the information necessary to separate the data.

Uplink power threshold adjustments are preferably determined using the same type of coding (for example, C1) as employed in the transmission of synch bursts. Power profile data which corresponds to traffic bursts transmitted using types of coding (for example, C2) different from the type of coding employed for the transmission of synch bursts is then used to determined the values of a set of uplink power offsets. The uplink power offsets are used by the UETs 301–305 to determine the uplink power level for transmission of traffic bursts at the initiation of a data transmission. One uplink power offset value may be determined for each type of coding that differs from the type of coding employed for the transmission of synch bursts. Each uplink power offset value represents the difference between the uplink power level which would be required to achieve a desired error rate for traffic bursts transmitted using a given type of coding, and the uplink power level which would be required to achieve the same desired error rate for traffic bursts transmitted using the type of coding employed for transmission of synch bursts.

As an example, a digital coding scheme C1 employed for the transmission of synch bursts (and also traffic bursts) may require an SBR of 5 dB to achieve a desired error rate in the decoding of received data at the satellite 370. A second coding scheme C2 employed for the transmission of traffic bursts may require an SBR of 10 dB to achieve the same desired error rate in the decoding of received data at the satellite 370. The difference in required SBRs to achieve the same error rate for the two types of coding is then 5 dB. If the background level is constant, the uplink traffic burst power level used when coding scheme C2 is employed must be 5 dB higher than the uplink synch burst power level used when coding scheme C1 is employed. For this example, the uplink power level to be used by a UET when initiating a data transmission using coding scheme C2 is determined by adding an uplink power offset value of 5 dB to the uplink reference power level.

When a UET is first commissioned, the uplink power offset values stored in the UET memory may, as part of the power profile data, be based on theoretical performance of digital codes. In practice, the uplink power offset values required to maintain a desired error rate may vary due to specific characteristics of interference and satellite receiver electronics. Once a terminal is operational, updates to the uplink power offset values are determined in a manner similar to the uplink power level threshold adjustments.

When the NCC 360 completes building the database corresponding to a given type of coding, the NCC 360 statistically analyzes the UET uplink power level information contained in that database. The NCC 360 preferably calculates the mean of the uplink power level information, and may also calculate additional parameters such as statistical variance or standard deviation. The NCC 360 then determines an uplink power offset value based on the statistical analysis. For example, if the NCC 360 determines in the statistical analysis that the average UET uplink traffic burst power level is 5 dB higher than the average UET uplink reference power level, the NCC 360 may determine an uplink power offset value of 5 dB (or alternatively N=40, where the step size is 0.125 dB).

When the NCC 360 arrives at an uplink power offset value, the NCC 360 sends a traffic burst containing the uplink power offset value to the UETs 301–305. The traffic burst travels over the NCC uplink 361 and communication links 310, 320, 330, 340, 350 from the satellite 370 to the UETs 301–305. The UETs 301–305 receive the uplink power offset value from the satellite 370 and adjust their respective local uplink power offset values. Thus, the system adapts the uplink power offset values to changing communication conditions.

Uplink power level thresholds and uplink power offset values may be controlled for an entire multicell coverage area for a satellite communication network. Alternatively, uplink power level thresholds and uplink power offset values may be controlled for each cell individually or for regions within individual cells. The degree of individuality for regions or cells depends on the needs of the particular satellite communication system application.

Unbalanced UET weighting in a cell is a potential issue that may adversely affect the statistical calculations. For example, UET3 303 is communicating over one chanslot at coding level C2, while UET5 305 is communicating over three chanslots at coding level C2. Thus the power level information from UET5 305 could dominate the statistical calculations even though it represents a relatively small cross-section of the cell 380. One solution to this is to have UETs reply with one average power level indication for each coding level rather than a power level indication for each chanslot. However, since the high traffic UETs are likely carrying the majority of the traffic, it is possible that unbalanced weighting is appropriate. Until more information becomes available, the preferable way to report uplink power level information is by a one-to-one chanslot-to-uplink power level correspondence.

The satellite communication systems illustrated thus far show all of the UETs in one cell. In an alternative embodiment of the present invention, the system is readily extended to multi-cell systems. In these embodiments, the NCC builds and analyzes separate databases for each cell in the system. This embodiment provides separate uplink power level thresholds and uplink power offset values to be determined for each cell, so that the communication system may be optimized, for example, for differences in satellite receiver electronics corresponding to different cells, as well as for differences in the interference characteristics of the particular geographic areas covered by each cell.

Figure 4:
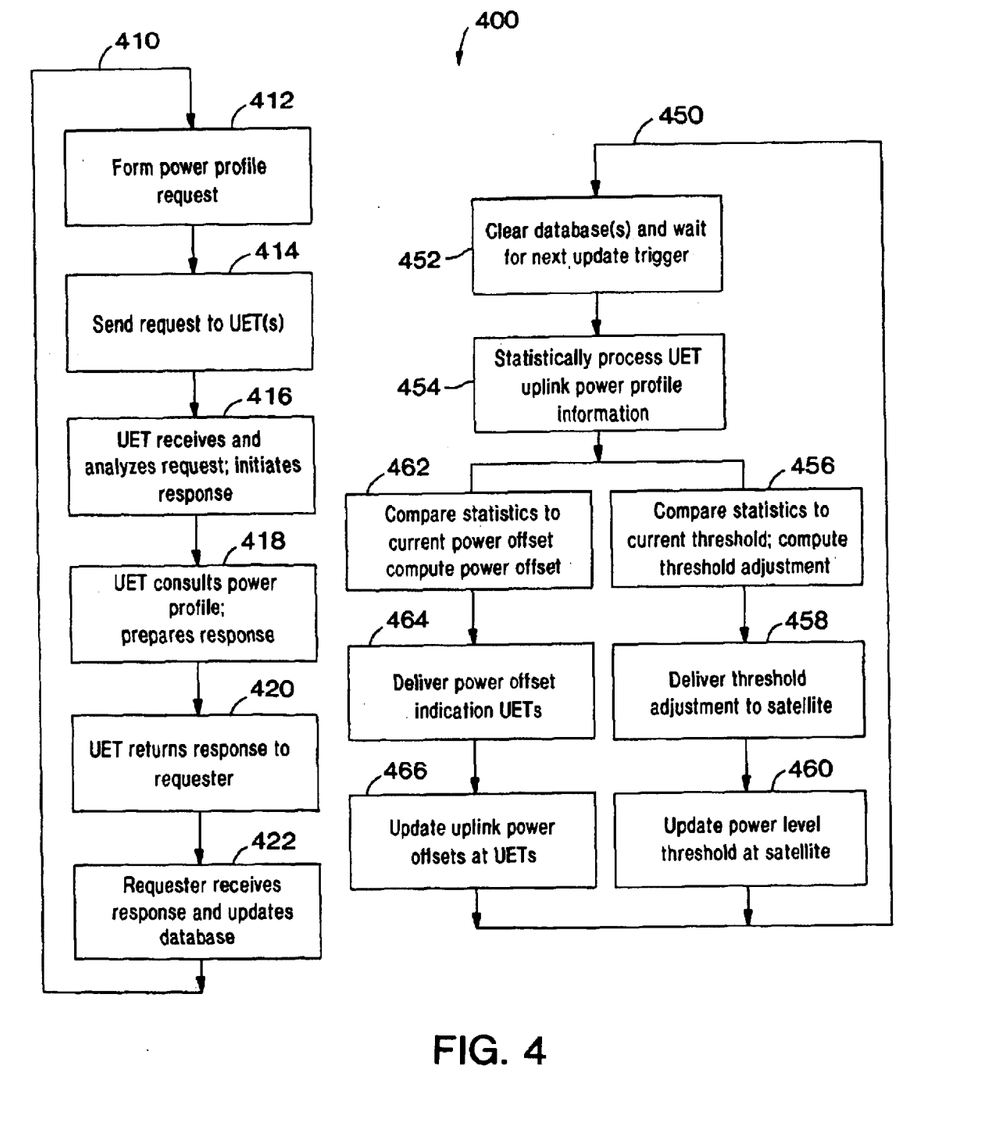
FIG. 4 illustrates a method for power threshold leveling for use in a satellite communication system according to an embodiment of the present invention.

FIG. 4 illustrates a method for power threshold leveling 400 for use in a satellite communication system according to an embodiment of the present invention. In the database building loop 410, the system forms a power profile request (UET uplink power information request) 412. The system then sends the power profile request to one or more UETs 414. One objective here is to obtain the necessary power profile information from each UET without overburdening the system with non-traffic data. Accordingly, the system may spread the power profile requests to the UETs over a relatively large time period.

When a UET receives a power profile request, the UET analyzes the request and initiates a UET power profile response 416. The UET then consults its power profile (containing uplink power level information) stored in memory, performs necessary measurements or calculations, and prepares the power profile response for sending 418. The UET then sends the completed response back to the power profile requestor 420, preferably via satellite.

When the requester (preferably the NCC) receives the power profile response, the requester extracts the power profile information and updates a power profile database. The database may, for example, include power profile histograms. The database building loop 410 continues indefinitely.

At the beginning of the threshold offset updating loop 450, the requestor clears the power profile database and waits to start the UET uplink power profile collection process 452. The requestor may wait for either a time event or some other type of event, like a performance degradation warning from the system. When the requester completes repopulating the power level database(s) with new UET uplink power profile information, the requester statistically analyzes the information. The requestor preferably determines the arithmetic mean, and optionally determines other statistical measures, such as variance or standard deviation 454.

In a system utilizing multiple coding levels, the requester determines an uplink power level threshold adjustment indication by analyzing the uplink power profile statistics for a chosen (or base) coding level in light of the current uplink power level threshold 456. The requestor communicates the new uplink power threshold adjustment to the satellite 458, which then processes the threshold adjustment to arrive at a new threshold 460.

The requestor also analyzes the database(s) of UET uplink power profile information for the non-base coding levels to arrive at uplink power offset values for the non-base coding levels 462. The requester communicates the new uplink power offset values to the UETs 464, which then update the power offset values stored in memory. The power offset values are then used by the UETs when establishing communication using non-base coding levels.

The preferred embodiments of the present invention provide a method and apparatus for adaptive power threshold leveling for a satellite communication system. In a communication environment with a dynamic interference component, closed-loop power threshold leveling enables earth terminals to more quickly converge to the appropriate uplink power level. Closed-loop power threshold leveling minimizes data loss by reducing co-channel interference caused by unnecessarily powerful transmissions and by reducing data error loss caused by unnecessarily weak transmissions.

While particular elements, embodiments and applications of the present invention have been shown and described, it will be understood that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A method for controlling an uplink power threshold level in a satellite communication system, the method comprising:
    obtaining uplink power level information from data stored at a plurality of user earth terminals (UETs);
    determining statistical characteristics of the uplink power level information;
    determining an uplink power threshold adjustment from information comprising the statistical characteristics; and
    controlling the uplink power threshold level by adjusting the uplink power threshold level according to the uplink power threshold adjustment.

2. The method of claim 1, wherein said step of controlling the uplink power threshold level comprises communicating the uplink power threshold adjustment to a satellite.

3. The method of claim 1, wherein said step of determining statistical characteristics of the uplink power level information comprises calculating the mean of the uplink power level information.

4. In a satellite communication system, a network control center comprising:
    a transmitter that sends power profile requests to earth terminals;
    a receiver that receives power profile responses from the earth terminals;
    a memory that stores power level information obtained from the power profile responses; and
    a processor that determines statistical characteristics of the power level information, and determines an uplink power threshold adjustment based on the statistical characteristics.

5. The network control center of claim 4, wherein a power profile response comprises an indication of the uplink power level for each of the channels currently in use by the respective earth terminal.

6. The network control center of claim 5, wherein a power profile response further comprises an indication of the coding level currently in use for each of the channels currently in use by the respective earth terminal.

7. The network control center of claim 5, wherein said processor determines the statistical characteristics of uplink power levels corresponding to channels over which information is being communicated at respective coding levels, and determines the uplink power threshold adjustment based on the statistical characteristics of uplink power levels corresponding to channels over which information is being communicated at a first coding level.

8. The network control center of claim 7, wherein said processor further determines an uplink power offset value based on the statistical characteristics of uplink power levels corresponding to channels over which information is being communicated at a second coding level.

9. The network control center of claim 4, wherein the power profile responses comprise differences between uplink reference power levels and uplink traffic burst power levels, and wherein said processor determines the uplink threshold level adjustment as an offset to a current uplink threshold level.

10. A satellite communication system comprising:
    a satellite having an uplink power level threshold;
    a plurality of earth terminals communicating with said satellite over uplink channels at respective uplink power levels; and
    a network control center that obtains uplink power level information from said earth terminals, determines statistical characteristics of the uplink power level information, determines an uplink power threshold adjustment based on the statistical characteristics, and communicates the uplink power threshold adjustment to said satellite,
    wherein the statistical characteristics of the uplink power level information comprise subsets of statistical characteristics corresponding to each coding level.

11. The satellite communication system of claim 10, wherein said network control center determines the uplink power threshold adjustment based on the subset of statistical characteristics corresponding to a first coding level, and determines an uplink power offset value for each other coding level.

12. The satellite communication system of claim 11, wherein said network control center communicates the uplink power offset value for each other coding level to said earth terminals.

13. The satellite communication system of claim 10, wherein the uplink power level information comprises an indication of uplink power level for each uplink channel in use, and wherein the statistical characteristics of the uplink power level information comprise the mean of the uplink power levels corresponding to each coding level in use.

14. The satellite communication system of claim 13, wherein said network control center determines the uplink power threshold adjustment as a function of the mean uplink power levels for channels over which information is being communicated at a first coding level, and determines an uplink power offset value for each other coding level as a function of the mean uplink power level for channels over which information is being communicated at a second coding level.

15. In a satellite communication system, an earth terminal that communicates with the satellite over at least one channel, the earth station comprising:
 a receiver that receives power profile requests from a requestor;
 a transmitter that communicates to a satellite over a channel at an uplink power level and a coding level;
 a memory that stores uplink power profile information representing at least one uplink power level for at least one channel; and
 a processor that processes the power profile requests, determines an uplink power profile response to return to the requester, and directs the transmitter to return the uplink power profile response to the requestor.

16. The earth terminal of claim 15, wherein the uplink power profile response comprises an uplink power level indication for each channel being used.

17. The earth terminal of claim 15, wherein the uplink power profile response comprises:
 an uplink reference power level; and
 an uplink traffic burst power level.

18. The earth terminal of claim 15, wherein the uplink power profile response comprises the difference between an uplink reference power level and an uplink traffic burst power level.

19. The earth terminal of claim 18, wherein the uplink power profile response further comprises a coding level indication for each channel in use by the earth terminal.

20. A satellite communication link embodied in a carrier wave propagating in free space comprising:
 a forward direction signal comprising a request for earth terminal power level information; and
 a reverse direction signal comprising a response to the request, the response comprising at least one of the group consisting of:
  an indication of an uplink reference power level and an uplink current power level; and
  an indication of a difference between an uplink reference power level and an current uplink power level.

21. The satellite communication link of claim 20, wherein said response comprises an uplink power level indication for each communication channel in use by an earth terminal.

22. The satellite communication link of claim 21, wherein said response further comprises a coding level indication for each communication channel is use by an earth terminal.

23. The satellite communication link of claim 20, wherein said forward direction signal further comprises uplink power threshold adjustment information.

24. A method for controlling an uplink power threshold level in a satellite communication system, the method comprising:
 obtaining uplink power level information for a plurality of user earth terminals (UETs), including communication an uplink power profile request from a network control center (NCC) to the UETs and communicating a UET uplink power profile response from the UETs to the NCC, the power profile response comprising UET uplink power level information;
 determining statistical characteristics of the uplink power level information;
 determining an uplink power threshold adjustment from information comprising the statistical characteristics; and
 controlling the uplink power threshold level by adjusting the uplink power threshold level: according to the uplink power threshold adjustment.

25. The method of claim 24, wherein said step of communicating a UET uplink power profile response comprises communicating a difference between a terminal uplink reference transmitting power level and a terminal uplink traffic burst transmitting power level.

26. A method for controlling an uplink power threshold level in a satellite communication system, the method comprising:
 obtaining uplink power level information from power profile data stored at a plurality of user earth terminals (UETs);
 determining statistical characteristics of the uplink power level information including calculating a mean of the uplink power level information and calculating an indication of variance of the uplink power level information;
 determining an uplink power threshold adjustment from information comprising the statistical characteristics; and
 controlling the uplink power threshold level by adjusting the uplink power threshold level according to the uplink power threshold adjustment.

27. The method of claim 26, wherein said step of determining an uplink power threshold adjustment comprises determining the threshold adjustment based on the mean and of the indication of variance in accordance with a desired proportion of earth terminals beginning communications at power levels above the anticipated appropriate power level.

28. A method for controlling an uplink power threshold level in a satellite communication system, the method comprising:
 obtaining uplink power level information and uplink coding level information for a plurality of user earth terminals (UETs), including obtaining UET uplink power level information and UET uplink coding level information;
 determining statistical characteristics of the uplink power level information, including determining respective statistical characteristics for sets of UETs transmitting information at respective uplink coding levels;
 determining an uplink power threshold adjustment from information comprising the statistical characteristics, including determining an uplink power threshold adjustment for each respective uplink coding level; and
 controlling the uplink power threshold level by adjusting the uplink power threshold level according to the uplink power threshold adjustment.

29. The method of claim 28, further comprising:
 determining the uplink power threshold adjustment corresponding to UETs transmitting information at a first coding level;
 determining an uplink power offset value corresponding to UETs transmitting information at a second coding level;
 communicating the uplink power threshold adjustment to a satellite; and
 communicating the uplink power offset value to the UETs.

30. A method for controlling an uplink power threshold level in a satellite communication system, the method comprising:
 obtaining uplink power level information for a plurality of user earth terminals (UETs), including obtaining UET uplink power level information and UET uplink coding level information for each channel in use by the satellite communication system;

determining statistical characteristics of the uplink power level information, including determining respective statistical characteristics for sets of channels over which information is being communicated at respective uplink coding levels;

determining an uplink power threshold adjustment from information comprising the statistical characteristics, including determining an uplink power level adjustment for each respective uplink coding level; and controlling the uplink power threshold level by adjusting the uplink power threshold level according to the uplink power threshold adjustment.

31. The method of claim 30, further comprising:

determining the uplink power threshold adjustment corresponding to channels over which information is being communicated at a first coding level;

determining an uplink power offset value corresponding to channels over which information is being communicated at a second coding level;

communicating the uplink power threshold adjustment to a satellite; and communicating the uplink power offset value to the UETs.

* * * * *